(12) United States Patent
Schmidt et al.

(10) Patent No.: US 7,593,811 B2
(45) Date of Patent: Sep. 22, 2009

(54) METHOD AND SYSTEM FOR FOLLOWING A LEAD VEHICLE

(75) Inventors: Mark Alvin Schmidt, Charlotte, NC (US); Kenneth Edward Hunt, Rock Hill, SC (US); David Roy Holm, Oconomowoc, WI (US); Scott Adam Stephens, Phoenix, AZ (US)

(73) Assignee: Deere & Company, Moline, IL (US)

( * ) Notice: Subject to any disclaimer, the term of this patent is extended or adjusted under 35 U.S.C. 154(b) by 945 days.

(21) Appl. No.: 11/095,318

(22) Filed: Mar. 31, 2005

(65) Prior Publication Data

US 2006/0229804 A1 Oct. 12, 2006

(51) Int. Cl.
*G01C 21/00* (2006.01)

(52) U.S. Cl. .................. 701/205; 701/213; 701/96; 701/300

(58) Field of Classification Search .............. 701/2, 701/50, 24, 96, 205–213, 300, 301; 180/167–179
See application file for complete search history.

(56) References Cited

U.S. PATENT DOCUMENTS

| | | | |
|---|---|---|---|
| 3,659,085 A | 4/1972 | Potter et al. | |
| 4,710,020 A | 12/1987 | Maddox et al. | |
| 4,829,442 A | 5/1989 | Kadonoff et al. | |
| 4,833,480 A | 5/1989 | Palmer et al. | 342/125 |
| 4,873,449 A | 10/1989 | Paramythioti et al. | |
| 5,307,271 A | 4/1994 | Everett, Jr. et al. | |
| 5,375,059 A | 12/1994 | Kyrtsos et al. | |
| 5,390,125 A | 2/1995 | Sennott et al. | |
| 5,438,517 A | 8/1995 | Sennott et al. | |
| 5,491,476 A | 2/1996 | DiBella | |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,810,105 A * | 9/1998 | Trainer | 180/169 |
| 5,874,918 A | 2/1999 | Czarnecki et al. | |
| 5,933,079 A | 8/1999 | Frink | |

(Continued)

FOREIGN PATENT DOCUMENTS

CA 1271546 7/1990

(Continued)

OTHER PUBLICATIONS

H. Edelsbruneer and T.S. Tan, *Quadratic time algorithm for the minmax length triangulation*, Proceedings of the 32nd Annual Symposium on Foundations of Computer Science, pp. 414-423, 1991, San Juan Puerto Rico.

(Continued)

*Primary Examiner*—Richard M. Camby

(57) ABSTRACT

A transmitter at a lead vehicle transmits a first transmission signal toward a first beacon and a second beacon associated with a following vehicle. A data processor or estimator determines a first propagation time associated with the first transmission and the first beacon and a second propagation time associated with the first transmission and the second beacon. A vehicle controller controls a heading of the following vehicle to maintain a first distance substantially equal to a second distance (i.e., first propagation time substantially equal to a second propagation time) or a first distance that deviates from the second distance by a predetermined maximum amount.

10 Claims, 13 Drawing Sheets

U.S. PATENT DOCUMENTS

| | | | |
|---|---|---|---|
| 5,974,347 | A | 10/1999 | Nelson |
| 5,982,164 | A | 11/1999 | Czarnecki et al. |
| 5,986,602 | A | 11/1999 | Frink |
| 6,011,974 | A | 1/2000 | Cedervall et al. |
| 6,057,800 | A | 5/2000 | Yang et al. |
| 6,072,421 | A | 6/2000 | Fukae et al. |
| 6,107,959 | A | 8/2000 | Levanon |
| 6,125,135 | A | 9/2000 | Woo et al. |
| 6,212,448 | B1 | 4/2001 | Xydis |
| 6,327,534 | B1 | 12/2001 | Levanon et al. |
| 6,369,754 | B1 | 4/2002 | Levanon |
| 6,407,703 | B1 | 6/2002 | Minter et al. |
| 6,420,999 | B1 | 7/2002 | Vayanos |
| 6,424,264 | B1 | 7/2002 | Giraldin et al. |
| 6,427,079 | B1 | 7/2002 | Schneider et al. |
| 6,459,966 | B2 | 10/2002 | Nakano et al. |
| 6,489,917 | B2 | 12/2002 | Geisheimer et al. |
| 6,556,942 | B1 | 4/2003 | Smith |
| 6,560,536 | B1 | 5/2003 | Sullivan et al. |
| 6,614,721 | B2 | 9/2003 | Bokhour |
| 6,640,164 | B1 | 10/2003 | Farwell et al. |
| 6,798,376 | B2 | 9/2004 | Shioda et al. |
| 6,861,979 | B1 | 3/2005 | Zhodzishsky et al. |
| 2001/0020214 | A1 | 9/2001 | Brenner |
| 2001/0022506 | A1 | 9/2001 | Peless et al. |
| 2001/0027360 | A1 | 10/2001 | Nakano et al. |
| 2001/0051527 | A1 | 12/2001 | Kuwahara et al. |
| 2002/0050944 | A1 | 5/2002 | Sheynblat et al. |
| 2002/0097181 | A1 | 7/2002 | Chou et al. |
| 2002/0175854 | A1 | 11/2002 | Shioda et al. |
| 2003/0005030 | A1 | 1/2003 | Sutton et al. |
| 2003/0007473 | A1 | 1/2003 | Strong et al. |
| 2004/0032363 | A1 | 2/2004 | Schantz et al. |
| 2005/0002481 | A1 | 1/2005 | Woo et al. |
| 2005/0192024 | A1 | 9/2005 | Sheynblat |
| 2006/0150584 | A1 | 7/2006 | Weiss |
| 2006/0224307 | A1 | 10/2006 | Schmidt et al. |
| 2006/0224308 | A1 | 10/2006 | Schmidt et al. |
| 2006/0224309 | A1 | 10/2006 | Schmidt et al. |

FOREIGN PATENT DOCUMENTS

| | | |
|---|---|---|
| EP | 0732641 | 9/1999 |
| EP | 1251362 | 10/2002 |
| WO | 98/34124 | 8/1998 |
| WO | 03101178 | 12/2003 |

OTHER PUBLICATIONS

F. van Diggelen and A. Brown, *Mathematical Aspects of GPS Raim*, IEEE Position Location and Navigation Symposium, pp. 733-738, 1994, Las Vegas, NV, USA.

European Search Report dated Apr. 17, 2007.

Jwo, D. J. Optimisation and sensitivity analysis of GPS receiver tracking loops in dynamic environments. IEE Proc.—Radar. Sonar Navig. , vol. 148, No. 4, Aug. 2001. IEE Proceedings online No. 20010429.

* cited by examiner

METHOD AND SYSTEM FOR FOLLOWING A LEAD VEHICLE

FIELD OF THE INVENTION

This invention relates to a method and system for following a lead vehicle.

BACKGROUND OF THE INVENTION

A lead vehicle may be a manned or an unmanned vehicle. In the case of a manned vehicle, an operator may use his or her judgment and perception to guide or navigate the vehicle in its environment. In the case of an unmanned vehicle, a guidance or navigation system may guide or navigate the vehicle in its environment. One or more following vehicles may track the path of the lead vehicle in a coordinated manner for military, agricultural or commercial activities. Thus, there is a need to maintain a desired degree of alignment and coordination over time between the lead position of lead vehicle and the following positions one or more following vehicles.

SUMMARY OF THE INVENTION

In accordance with one aspect of the invention, a transmitter at a lead vehicle transmits a first transmission signal toward a first beacon and a second beacon associated with a following vehicle. A data processor or estimator determines a first propagation time associated with the first transmission and the first beacon; a data processor or estimator determines a second propagation time associated with the first transmission and the second beacon. A vehicle controller controls a heading of the following vehicle to maintain a first propagation time substantially equal to a second propagation time or a first propagation time that deviates from the second propagation time by a predetermined maximum amount.

DESCRIPTION OF THE PREFERRED EMBODIMENT

Figure 1A:
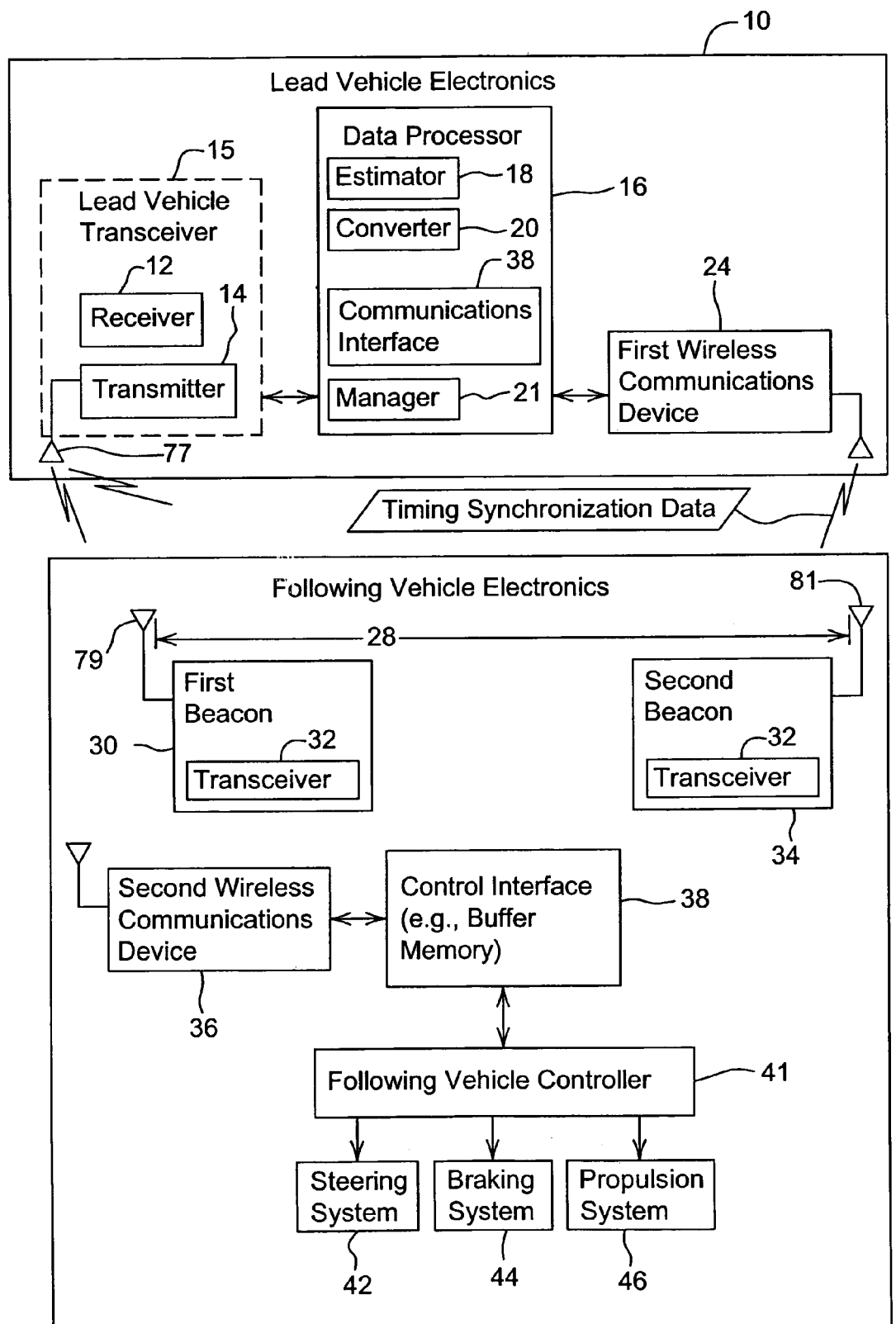
FIG. 1A is a block diagram of one embodiment of a system for following a lead vehicle in accordance with the invention.

In accordance with one embodiment, FIG. 1A illustrates a system 11 for tracking a path or position (or position and heading) of a lead vehicle. The following vehicle is synonymous with the term trailing vehicle as used herein. The system 11 comprises lead vehicle electronics 10 that communicates with following vehicle electronics 26 via an electromagnetic signal (e.g., radio frequency signal or microwave signal).

The lead vehicle electronics 10 comprises a receiver 12 and a transmitter 14 coupled to a data processor 16. The combination of the receiver 12 and the transmitter 14 may be referred to as lead vehicle transceiver 15. A first wireless communications device 24 is coupled to the data processor 16. In one embodiment, the data processor 16 may comprise an estimator 18, a converter 20, a manager 21, and a communications interface 22.

The following vehicle electronics 26 comprises a first beacon 30 and a second beacon 34 that are separated by a known separation distance 28. In one embodiment, the first beacon 30 and second beacon 34 each comprise a transceiver 32. Further, the vehicle electronics 26 includes a second wireless communications device 36 coupled to a control interface 38. In turn, the control interface 38 is coupled to a following vehicle controller 41. The following vehicle controller 41 may send control signals to one or more of the following devices via a logical data path or a physical data path (e.g., a databus): a steering system 42, a braking system 44, and propulsion system 46.

The steering system 42 may comprise an electrically controlled hydraulic steering system, an electrically driven rack-and-pinion steering, an Ackerman steering system, or another steering system. The braking system 44 may comprise an electrically controlled hydraulic braking system, or another electrically controlled friction braking system. The propulsion system 46 may comprise an internal combustion engine, an internal combustion engine-electric hybrid system, an electric drive system, or the like.

The following vehicle controller 41 may generate control signals for the steering system 42, a braking system 44 (if present), and a propulsion system 46 that are consistent with tracking a path plan, provided by the path planning module. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

The data processor 16 or estimator 18 estimates a relative position or location (or location and heading) of the following vehicle with respect to the lead vehicle based on the elapsed propagation time associated with an outgoing propagation path to the following vehicle electronics 26, an incoming propagation path from the following vehicle electronics 26, or both. The data processor 16 may be configured in several different ways. In a first configuration of the data processor, the data processor 16 may process the elapsed propagation times directly, rather than converting them to corresponding distances. Under the first configuration, the converter 20 is not used and may be deleted. In a second configuration, of the data processor 16, the converter 20 is used.

If the converter 20 is used, the converter 20 may convert the elapsed propagation time into a radius or distance based on the following equation: distance=c*t, where c=3×10$^8$ meters/seconds (speed of light), t=elapsed time or propagation time, and distance is distance in meters. If the round trip propagation time is used as the elapsed time, the distance (d) is divided by two to obtain the distance or radius between the lead vehicle antenna 77 (e.g., antenna coupled to transmitter 14) and the following vehicle antenna 79 associated with the beacons (30, 34 or 130, 134). Further, there may be a time or distance deduction for bias or processing lag within each beacon.

The manager 21 manages the relationship between a first propagation delay and the second propagation delay (e.g., under a first configuration), or between the first distance and the second distance (e.g., under a second configuration). The first propagation delay is the delay associated with propagation of the electromagnetic signal between the transmitter 14 (e.g., the lead vehicle antenna 77) and the first beacon 130 (e.g., the first following vehicle antenna 79), whereas the second propagation delay is the delay associated with the propagation of the electromagnetic signal between the transmitter 14 (e.g., the lead vehicle antenna 77) and the second beacon 134 (e.g., the second following vehicle antenna 81). The first propagation delay is generally proportional to a first distance between a first following vehicle antenna 79 and a lead vehicle antenna 77; the second propagation delay is generally proportional to a second distance between the second following vehicle 81 antenna 79 and a lead vehicle antenna 77.

The communications interface 22 supports communications of the distance data, temporal data, or relative position data (e.g., heading and spatial separation) to the following vehicle electronics 26 via a first wireless communications devices 24 and a second wireless communications device 36 associated with the lead vehicle and the following vehicle, respectively.

At the following vehicle electronics 26, the control interface 38 receives the distance data, temporal data, or relative position data and provides it to the following vehicle controller 41. The following vehicle controller 41 may direct the vehicle to maintain a safe or uniform distance and/or heading from the lead vehicle or to track the path of the lead vehicle. For example, the vehicle controller 41 may command the steering system 42 to track the path of the lead vehicle and the propulsion system 46 to track the acceleration, speed or velocity of the lead vehicle.

Figure 1B:
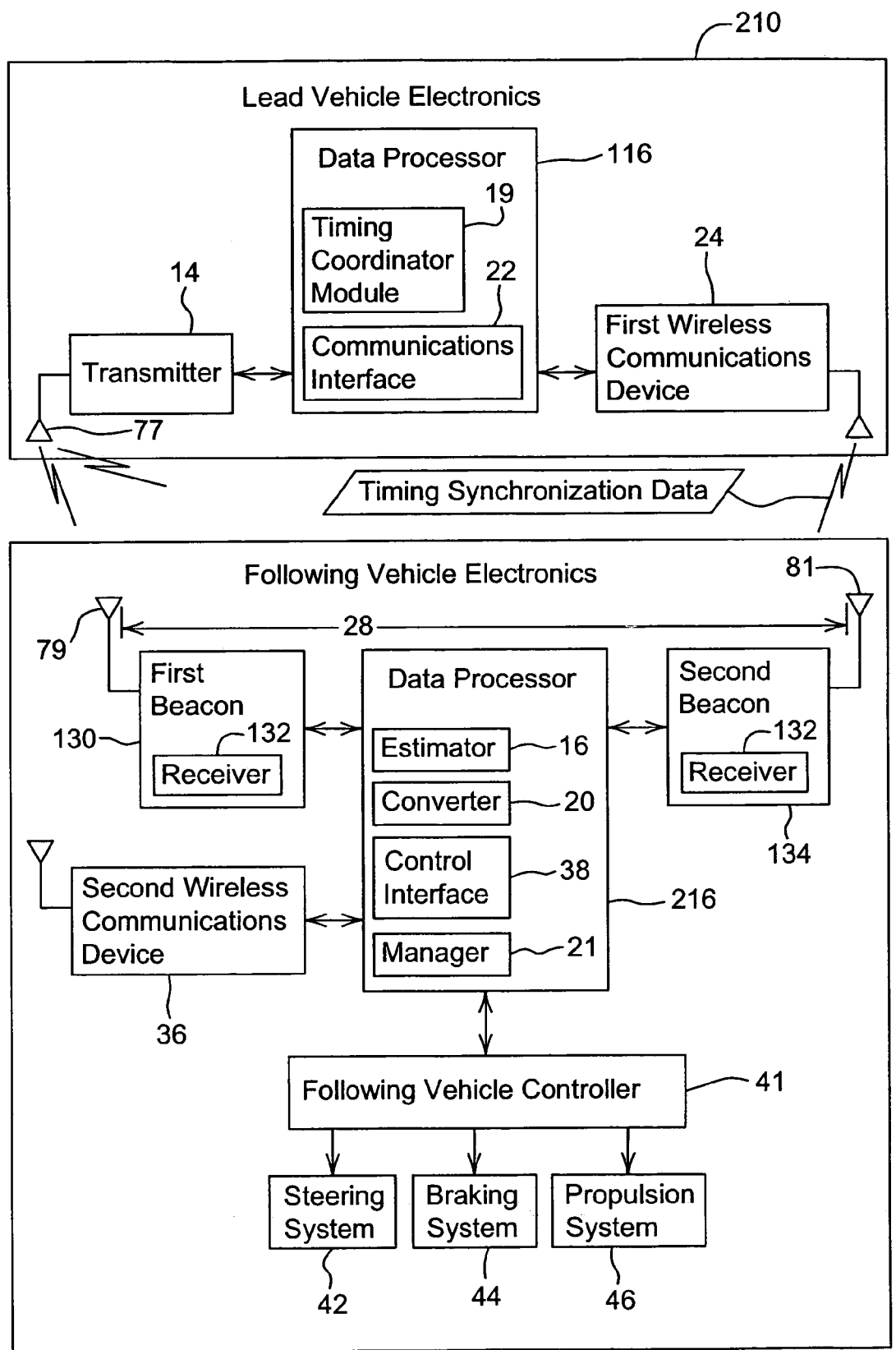
FIG. 1B is a block diagram of another embodiment of a system for following a lead vehicle in accordance with the invention.

The vehicle tracking system 111 of FIG. 1B differs from the vehicle tracking system 11 of FIG. 1A in that the vehicle tracking system 111 of FIG. 1B is generally configured to use one-way propagation time from the transmitter 14 to each beacon (130, 134), as opposed to a two-way or round-trip propagation time between the transceiver 15 and the beacons (30, 34). Like reference numbers in FIG. 1A and FIG. 1B indicate like elements.

In FIG. 1B, the lead vehicle electronics 210 comprises a data processor 116. The data processor 116 comprises a timing coordination module 19 and a communications interface 22. The timing coordination module 19 transmits or exchanges timing synchronization data or timing data between the lead vehicle electronics 210 and the following vehicle electronics 226 to support knowledge of the transmission time at the following vehicle electronics 226. For example, the first wireless communications device 24 and the second wireless communications device 36 may communicate to exchange timing synchronization data or transmission time data for the coordination of clock or timing signals of the lead vehicle electronics 210 and the following vehicle electronics 226.

The following vehicle electronics 226 comprises a first beacon 130 and a second beacon 134. The first beacon 130 and the second beacon 134 each include a receiver 132, which is coupled to the data processor 216. The data processor 216 comprises an estimator 18, a converter 20, a control interface 38, and a manager 21. The system 11 of FIG. 1B estimates the first propagation delay and the second propagation delay at the data processor 216 of the following vehicle electronics 226. In a similar fashion to FIG. 1A, the data processor 216 may use the first propagation delay and the second propagation delay (or data or signals, representative thereof) directly to control data from the following vehicle controller 41

In an alternative embodiment, the converter 20 may convert the first propagation delay and the second propagation delay into a first distance and a second distance, respectively for subsequent processing into control data. The manager 21 can use temporal data or distance data to develop management or control data for the following vehicle controller 41.

For both the system 11 of FIG. 1A and the system 111 of FIG. 1B, the known separation distance 28 refers to a separation (e.g., horizontal separation) between following vehicle antennas 79 associated with the beacons (30 and 34, or 130 and 134). Further, by measuring the range from the antennas 79 associated with the beacons of the following vehicle electronics 226 to an antenna 77 associated with the transmitter 14 or lead vehicle transceiver 15 of the lead vehicle electronics 210, the distance and angle of the leading vehicle relative to the following vehicle can be determined. The ranging accuracy (r) for distance may provide an accuracy of within a range from 3 centimeters to 1 centimeter, or less, for example. The angular estimation accuracy (in radians) is consistent with the following equation:

$$a = \sqrt{\frac{2r}{s}},$$

where a is the angular estimation accuracy in radians, r is the range accuracy, and s is the known separation distance 28. Advantageously, if part of the ranging error in the ranging accuracy is caused by a bias or delay that is common to both, the bias or delay will cancel out when the angular estimation is completed.

Figure 2:
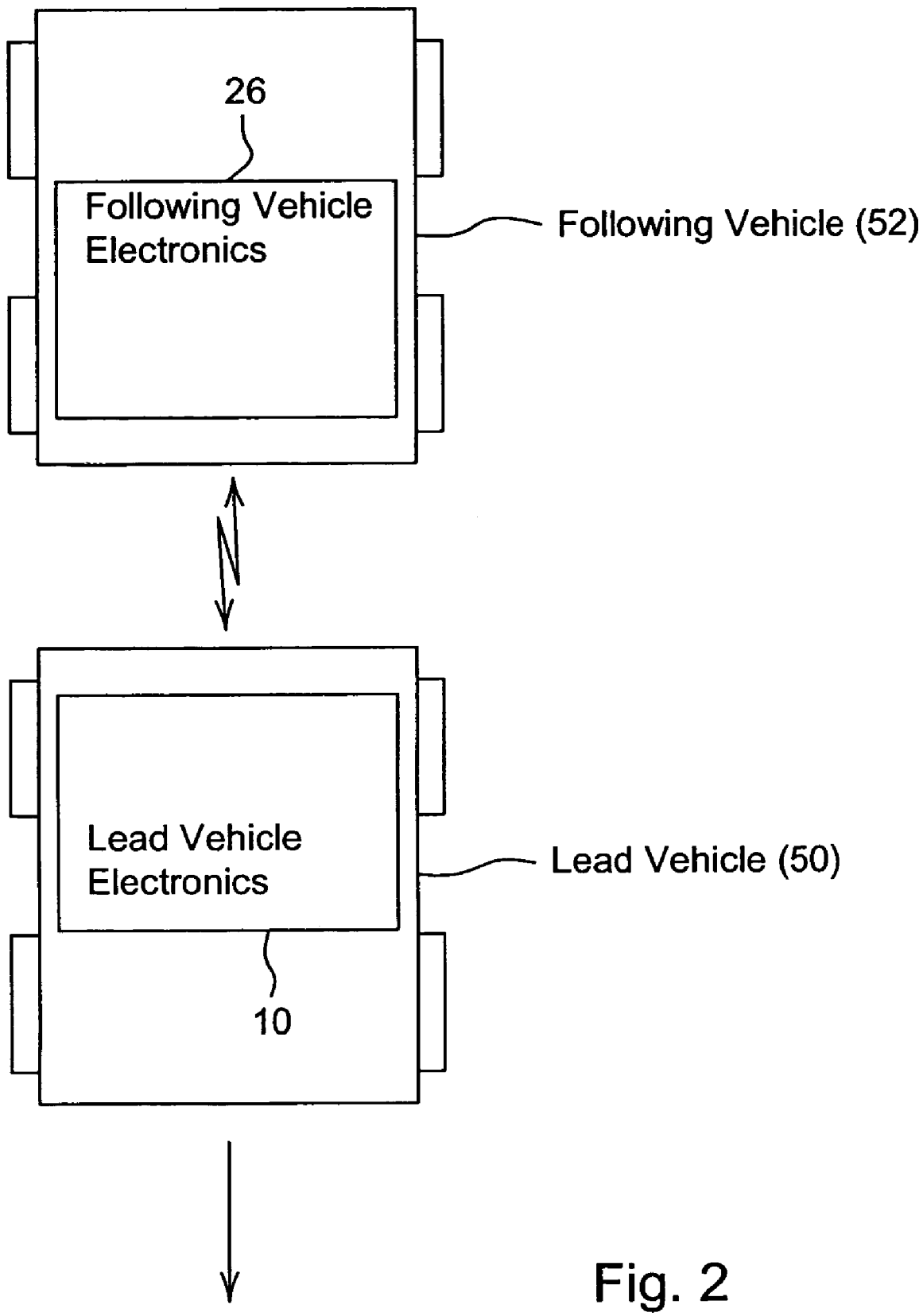
FIG. 2 is an illustrative diagram of a following vehicle tracking a path of a lead vehicle.

FIG. 2 shows a following vehicle 52 tracking a lead path or lead position (or lead position and heading) of a lead vehicle 50. The following vehicle 52 may follow or trace the path (or lead position and heading) of the lead vehicle 50 with an offset or delay in time based on one or more of the following: (1) the spatial separation between the lead vehicle 50 and the following vehicle 52, (2) the relative speed or relative velocity between the lead vehicle and following vehicle 52, and (3) the relative acceleration or deceleration between the lead vehicle and the following vehicle 52. The following vehicle 52 has a following path or a following position. Like reference numbers in FIG. 1A and FIG. 2 indicate like elements.

The lead vehicle electronics 10 may determine the relative positions (e.g., spatial separation and vehicular headings) of the lead vehicle 50 and the following vehicle 52. If the lead vehicle electronics 10 is associated with a location determining receiver (e.g., Global Positioning system receiver with differential correction), the absolute or real world coordinates of the lead vehicle 50 may be first determined and then the absolute or real world coordinates of the following vehicle 52 may be derived by the relative positions of the lead vehicle 50 and the following vehicle 52. However, it may be sufficient to use the relative coordinates and positions between the vehicles for vehicular control and guidance (e.g., collision avoidance).

Figure 3A:
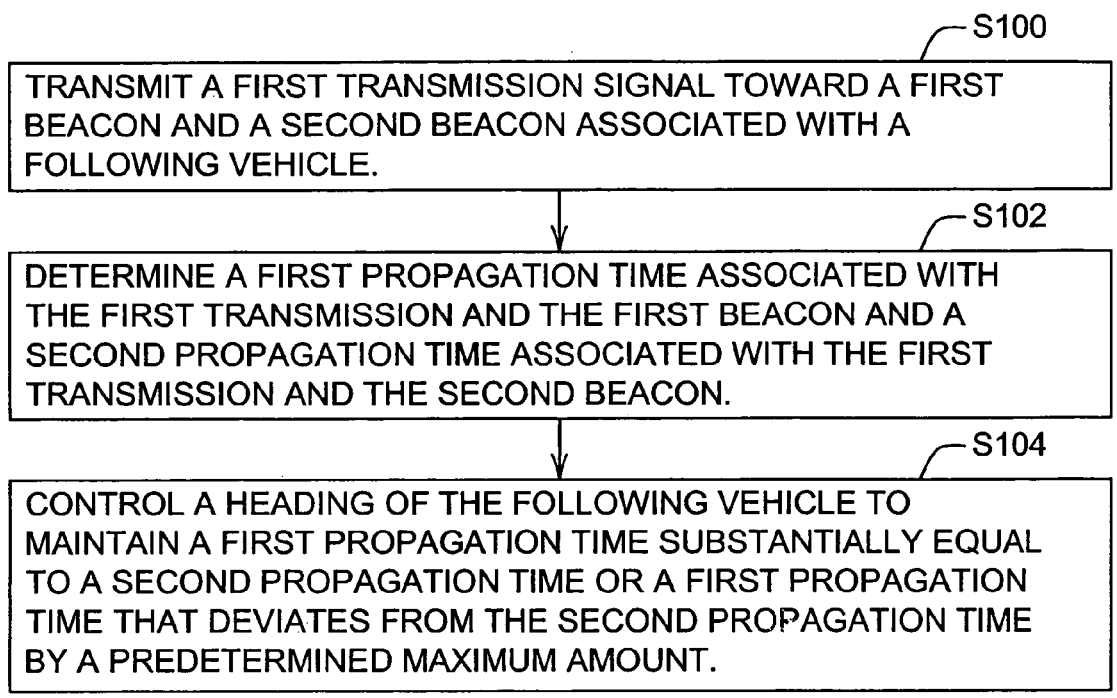
FIG. 3A is a flow chart of one embodiment of a method for following a lead vehicle.

FIG. 3A shows a method for following a vehicle tracking a lead path or lead position of a lead vehicle. The method of FIG. 3A begins in step S100.

In step S100, a transmitter 14 at a lead vehicle transmits a first transmission signal (e.g., an identifiable pulse) at a transmission time toward a first beacon (30 or 130) and a second beacon (34 or 134) associated with a following vehicle. The first transmission signal may be modulated with a coded signal (e.g., pseudo-random noise code), a pulse, a pulse train, phase shift keying, amplitude shift keying, frequency shift keying, pulse width modulation, pulse amplitude modulation, pulse phase modulation, or any other suitable modulation scheme.

In step S102, a data processor (16 or 216) or estimator 18 determines a first propagation time associated with the first transmission and the first beacon (30 or 130) and a second propagation time associated with the first transmission and the second beacon (34 or 134). The determination of the first propagation time and the second propagation time may be carried out in accordance with various techniques, which may be applied alternately or cumulative.

Under a first technique, the first propagation time comprises a propagation time between the transmission time at the transmitter 14 and a reception time at the first beacon (30 or 130) (e.g., for a unidirectional or one-way path), and the second propagation time comprises a propagation time between the transmission time at the transmitter 14 and a reception time at the second beacon (34 or 134) (e.g., for a unidirectional or one-way path).

Under a second technique, the first propagation time comprise a first aggregate elapsed time between the transmission time of the first transmission signal to a first beacon 30 and a return signal from the first beacon 30 to the lead vehicle electronics 10. Further, the second propagation time comprises a second aggregate elapsed time between the transmission time of the first transmission signal to a second beacon 34 and a return signal from the second beacon 34 to the lead vehicle electronics 10.

Under the first technique, the second technique, or any other technique, the transmission time of the first transmission (e.g., identifiable pulse) is provided to or known by the estimator 18 or data processor 16. Further, under the first technique or the second technique, the relative separation distance between the lead vehicle and the following or trailing vehicle may be determined as well as the relative heading between the lead vehicle and the trailing or following vehicle. The relative separation is actually dependent upon where the antennas (77, 79) are mounted on the lead and following vehicles, and on any spatial offset or temporal offset, that may be required to obtain the relative physical distance (e.g., front to rear spacing or bumper-to-bumper spacing) of the vehicles. Under the first technique, a clock synchronization signal or timing synchronization data may be shared between the lead vehicle electronics (10 or 210) and the following vehicle electronics (26 or 226) to coordinate the timing (and minimize phase differences) in the locally generated precision clock signals. The lead vehicle electronics 10, the following vehicle electronics 20, or both may comprise precision clocks, precision oscillators, or waveform generators with sufficient frequency stability to product accurate ranging measurements. The clock synchronization or transmission time data may be distributed or transmitted wirelessly prior to, during, or after the first transmission.

Under the second technique, consistent with the configuration of FIG. 1A, the estimator 18 or data processor 16 may be co-located with the transmitter 14 and the transmitter 14 may be associated with a receiver 12 or transceiver 15 for receiving a return signal from one or more beacons based on the first transmission signal.

In step S104, a following vehicle controller 41 controls a heading, or a position, or both a heading and position of the following vehicle to maintain a first propagation time equal to a second propagation time, or a first propagation time that deviates from the second propagation time by a predetermined maximum amount. For example, following vehicle controller 41 controls a heading of the following vehicle such that the first propagation time substantially equal to a second propagation time. Here, the first propagation time and the second propagation time are representative of or proportional to the first distance and the second distance. The first distance refers to a distance between a following vehicle antenna 79 at the first beacon (30 or 130) and lead vehicle antenna 77. The second distance refers to a distance between a second following vehicle antenna 81 at the second beacon (34 or 134) and the lead vehicle antenna 77. Alternatively, the converter 20 or data processor 16 converts the first propagation time and the second propagation time into a first distance and a second distance, respectively, prior to processing by the following vehicle controller 41 such that representative distances of the propagation times are processed.

Figure 3B:
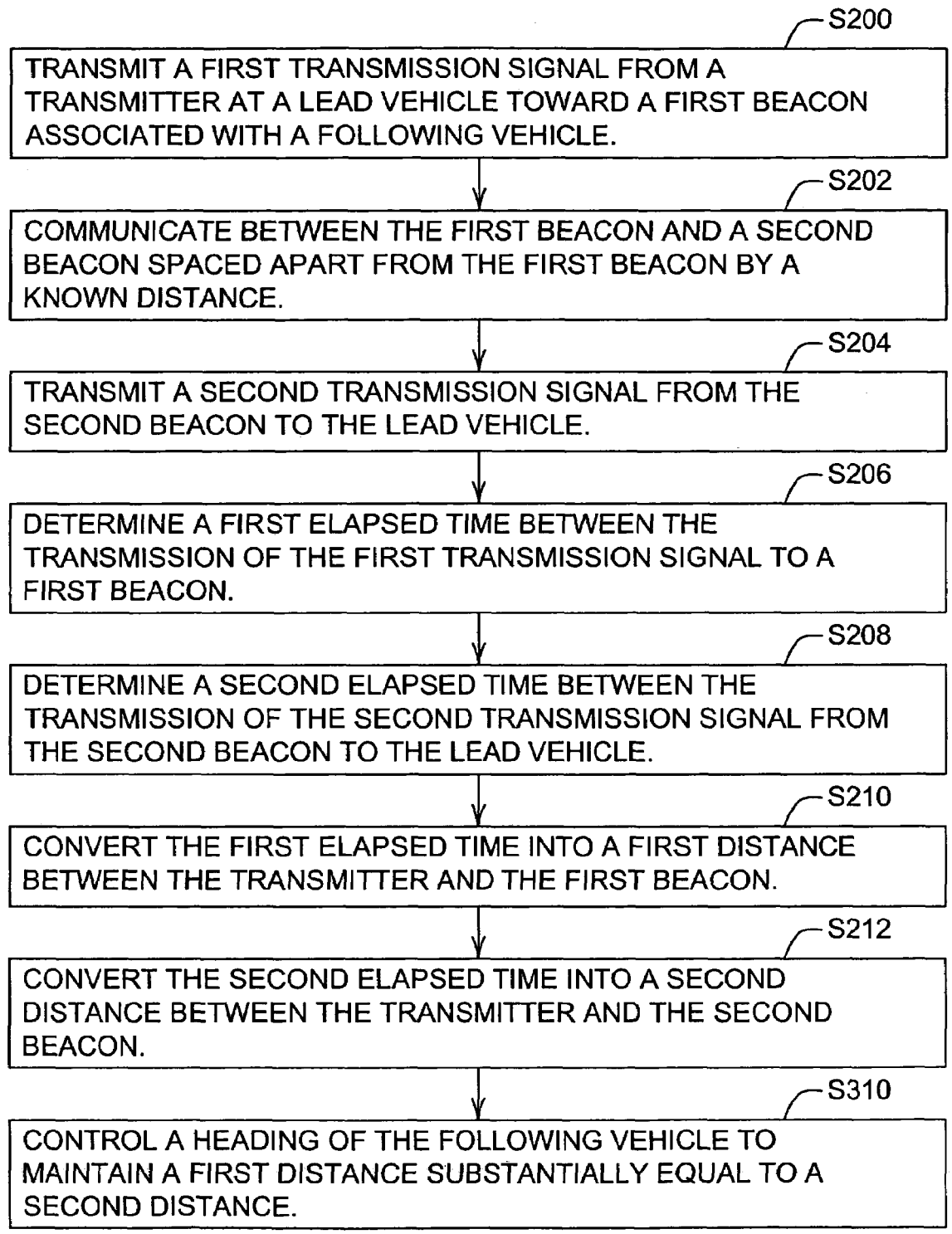
FIG. 3B is a flow chart of another embodiment of a method for following a lead vehicle.

FIG. 3B shows a method for a trailing vehicle to track a lead path or lead position of a lead vehicle. The method of FIG. 3B describes a procedure in which a unidirectional transmission flows from the transmitter 40 to the first beacon 130, from the first beacon 130 to the second beacon 134, and from the second beacon 134 to the receiver 12. The method of FIG. 3B begins in step S200.

In step S200, a transmitter 14 at lead vehicle transmits a first transmission signal toward a first beacon 30 associated with a following vehicle or trailing vehicle.

In step S202, the first beacon 30 and a second beacon 34 communicate with each other. The first beacon 30 and the second beacon 34 may be spaced apart by a known distance or there may be a generally fixed communication delay associated with communications (e.g., over wireless, wireline, or transmission line) between the beacons (30, 34). For example, the first beacon 30 and second beacon 34 may communicate via a transmission line, coaxial cable, or another configuration where the propagation delay associated with the transmission line is measured or predetermined for a given length of transmission line. In one embodiment, the first beacon 30 communicates one or more of the following: (1) the transmission time from the transmitter 14, (2) the receipt time at the transceiver 32, (3) both the transmission time from the transmitter 14 and the receipt time at the transceiver 32, and (4) a difference between the transmission time and the receipt time to the second beacon 34. The lead vehicle electronics 10 and the following vehicle electronics 26 may require precision oscillators or clocks that are synchronized with the exchange or synchronization data to properly evaluate and judge the foregoing transmission time, receipt time, time difference, and any other propagation time between the following vehicle electronics 26 and the lead vehicle electronics 10.

In step S204, the second beacon 34 transmits a second transmission signal to the lead vehicle. At the lead vehicle electronics 10, the receiver 12 or transceiver 15 receives the second transmission signal and provides the demodulated or decoded signal to the data processor 16

In step S206, the data processor 16 or estimator 18 determines a first elapsed time between the transmission of the first transmission signal to the first beacon 30.

In step S208, the data processor 16 or estimator 18 determines a second elapsed time between the transmission of the second transmission signal from the second beacon 34 to the lead vehicle.

In step S210, the data processor 16 or converter 20 converts the first elapsed time into a first distance (e.g., first distance 55) between the transmitter 14 and the first beacon 30.

In step S212, the data processor 16 or converter 20 converts the second elapsed time into a second distance (e.g., second distance 57) between the transmitter 14 and the second beacon 34.

In step S310, the data processor 16 or a following vehicle controller 41 controls at least one of a heading and a position of the following vehicle to maintain a first distance substantially equal to a second distance. The first distance means the displacement between lead vehicle antenna 77 and first following vehicle antenna 79 of the first beacons 30. The second distance means the displacement between the lead vehicle antenna 77 and the second following vehicle antenna 81 of the second beacon 34.

Figure 4:
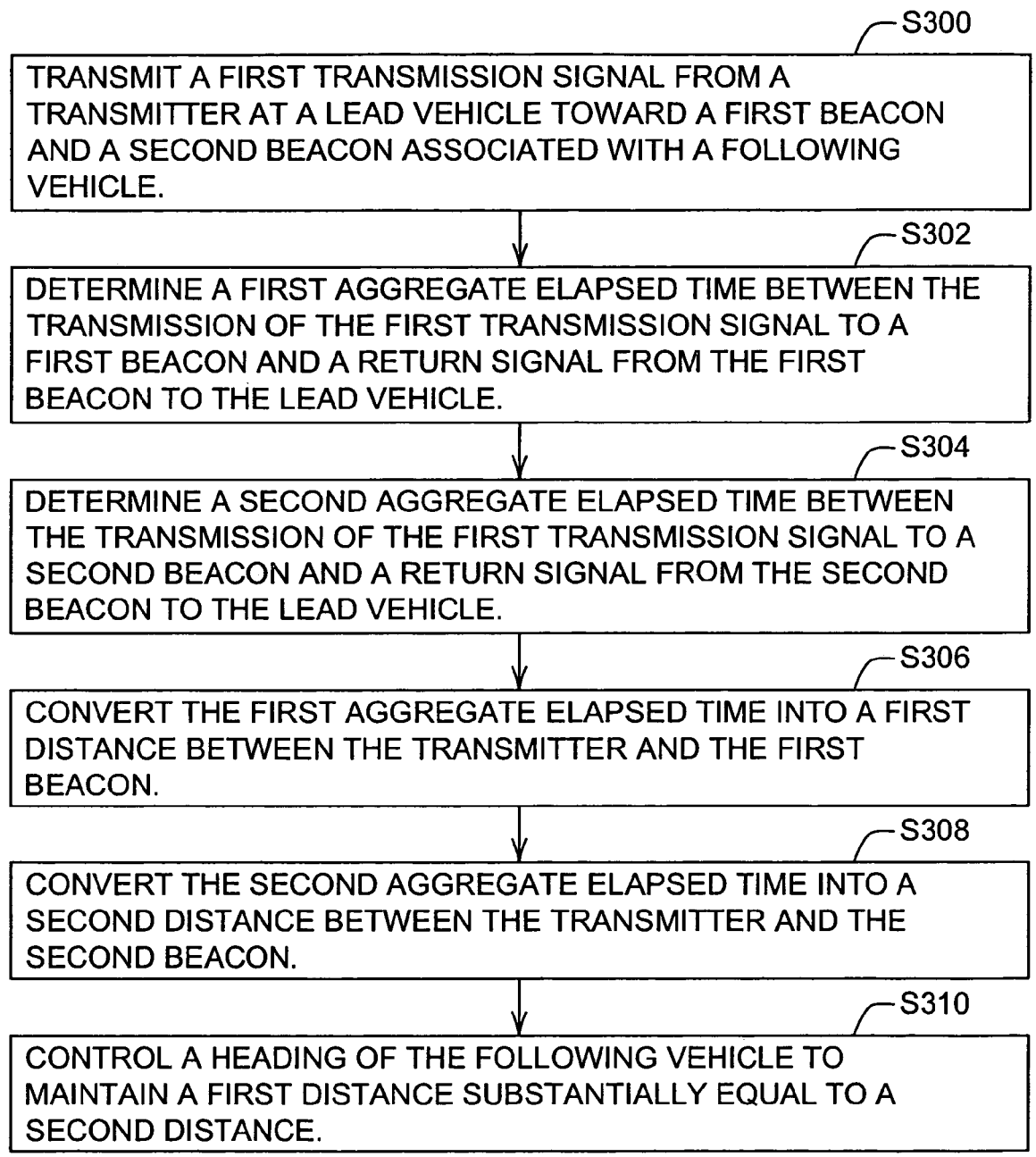
FIG. 4 is a flow chart of yet another embodiment of a method for following a lead vehicle.

FIG. 4 shows a method for following vehicle tracking a lead path or lead position of a lead vehicle. The method of FIG. 4 starts in step S300.

In step S300, a transmitter 14 at a lead vehicle transmits a first transmission signal toward a first beacon 30 and a second beacon 34 associated with a following vehicle.

In step S302, a data processor 16 or estimator 18 determines a first aggregate elapsed time between transmission of the first transmission signal to a first beacon 30 and a return signal from the first beacon 30 to the lead vehicle. Prior to the determination of the first aggregate elapsed time, the receiver 12 or the transceiver 15 may receive the return signal for determination of the first aggregate elapsed time by the estimator 18 or the data processor 16.

In step S304, the data processor 16 or estimator 18 determines a second aggregate elapsed time between the transmission of the first transmission signal to a second beacon 34 and a return signal from the second beacon 34 to the lead vehicle. Prior to the determination of the first aggregate elapsed time, the receiver 12 or the transceiver 15 may receive the return signal for determination of the second aggregate elapsed time by the estimator 18 or the data processor 16.

In step S306, the data processor 16 or converter 20 converts the first aggregate elapsed time into a first distance between the transmitter 14 and the first beacon 30. The first distance refers to a distance between a following vehicle antenna 79 at the first beacon (30 or 130) and lead vehicle antenna 77.

In step S308, the data processor 16 or converter 20 converts the second aggregate elapsed time into a second distance (e.g., second distance 57) between the transmitter 14 and the second beacon 34. The second distance refers to a distance between a second following vehicle antenna 81 at the second beacon (34 or 134) and the lead vehicle antenna 77.

In step S310, the vehicle controller 41 controls a heading of the following vehicle to maintain a first distance substantially equal to a second distance.

Figure 5:
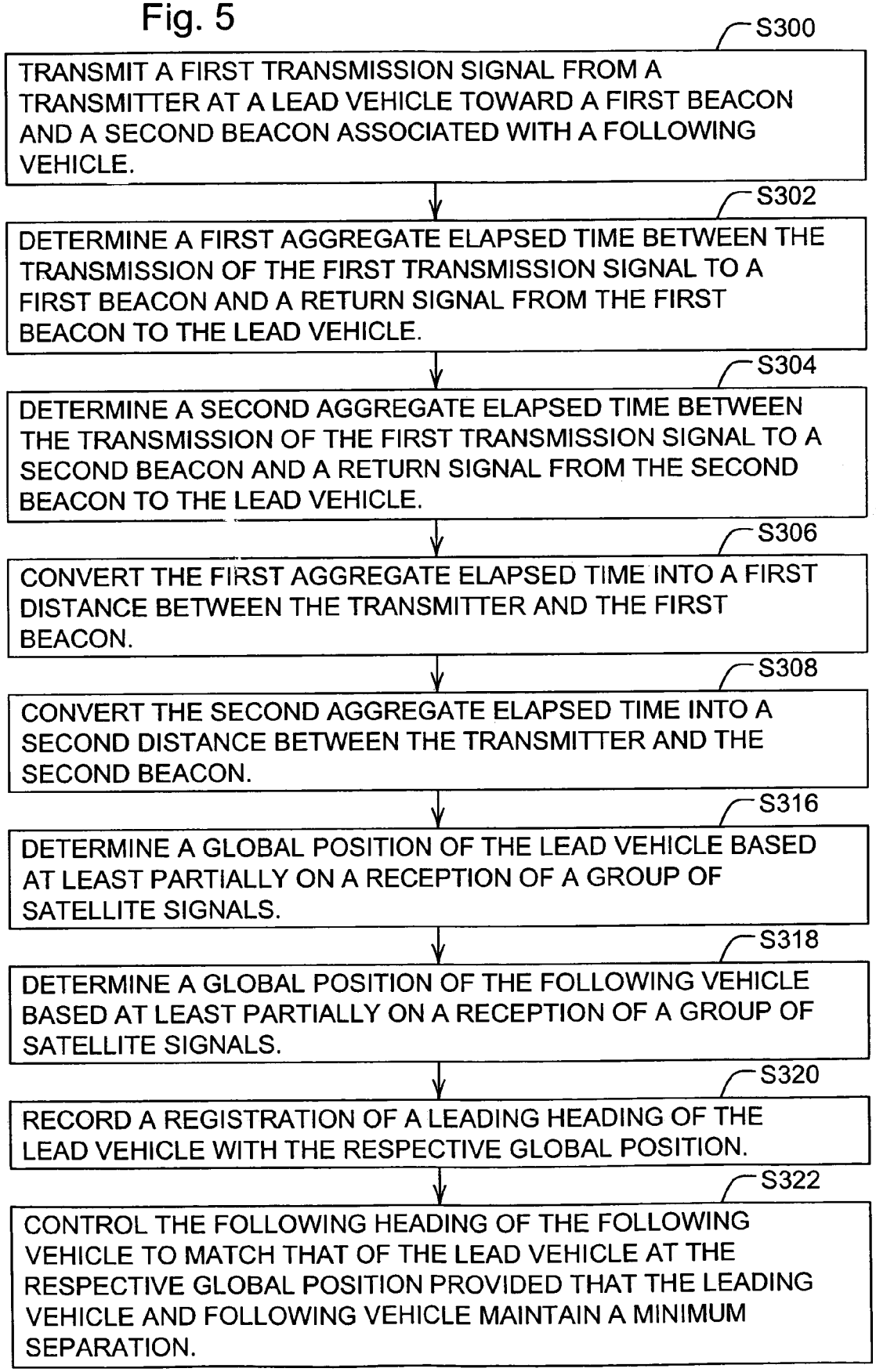
FIG. 5 is a flow chart of still another embodiment of a method for following a lead vehicle.

FIG. 5 shows a method for following vehicle tracking a lead path or lead position of a lead vehicle. Like reference numbers in FIG. 4 and FIG. 5 indicate like steps or procedures. The method of FIG. 5 starts in step S300.

In step S300, a transmitter 14 at a lead vehicle transmits a first transmission signal toward a first beacon 30 and a second beacon 34 associated with a following vehicle.

In step S302, a data processor 16 or estimator 18 determines a first aggregate elapsed time between transmission of the first transmission signal to a first beacon 30 and a turn signal from the first beacon 30 to the lead vehicle.

In step S304, the data processor 16 or estimator 18 determines a second aggregate elapsed time between the transmission of the first transmission signal to a first beacon 30 and a return signal from the first beacon 30 to the lead vehicle.

In step S306, the data processor 16 or converter 20 converts the first aggregate elapsed time into a first distance between the transmitter 14 and the first beacon 30.

In step S308, the data processor 16 or converter 20 converts the second aggregate elapsed time into a second distance between the transmitter 14 and the second beacon 34.

In step S316, a first location-determining receiver (e.g., 60 in FIG. 10) of the lead vehicle determines a global position of the lead vehicle based at least partially on the reception of a group of satellite signals.

In step S318, a second location-determining receiver (e.g., 67 in FIG. 10) determines a global position of the following vehicle based at least partially on a reception of a group of satellite signals.

In step S320, a recorder or data storage device (e.g., 63 in FIG. 10) records a registration of a lead vehicle with the respective global position.

In step S322, the vehicle controller 41 controls the following heading of the following vehicle to match that of the lead vehicle at the respective global position provided that the leading vehicle and following vehicle maintain a minimum separation. In one example, if the following vehicle tracks the lead vehicle by a nominal or minimal amount, the following vehicle may track the heading of the leading vehicle virtually instantaneously. However, if there is a spatial separation between the leading and following vehicle, the following vehicle may delay its heading tracking based on the separation between the vehicles, velocity, and acceleration. If the lead vehicle and the following vehicle are both equipped with the first location-determining receiver 60 and the second location-determining receiver 61, respectively, the following location of the following vehicle may be associated with the same or substantially the same heading as the leading vehicle when the leading vehicle was at the following location. In this way, the lead vehicle may store its heading information and associate it with its instantaneous location in the data storage device 63 or transmit pairs of heading information and corresponding location data to the following vehicle via a wireless communications channel (e.g., via the first wireless communications device 24 and the second wireless communications device 36).

Figure 6:
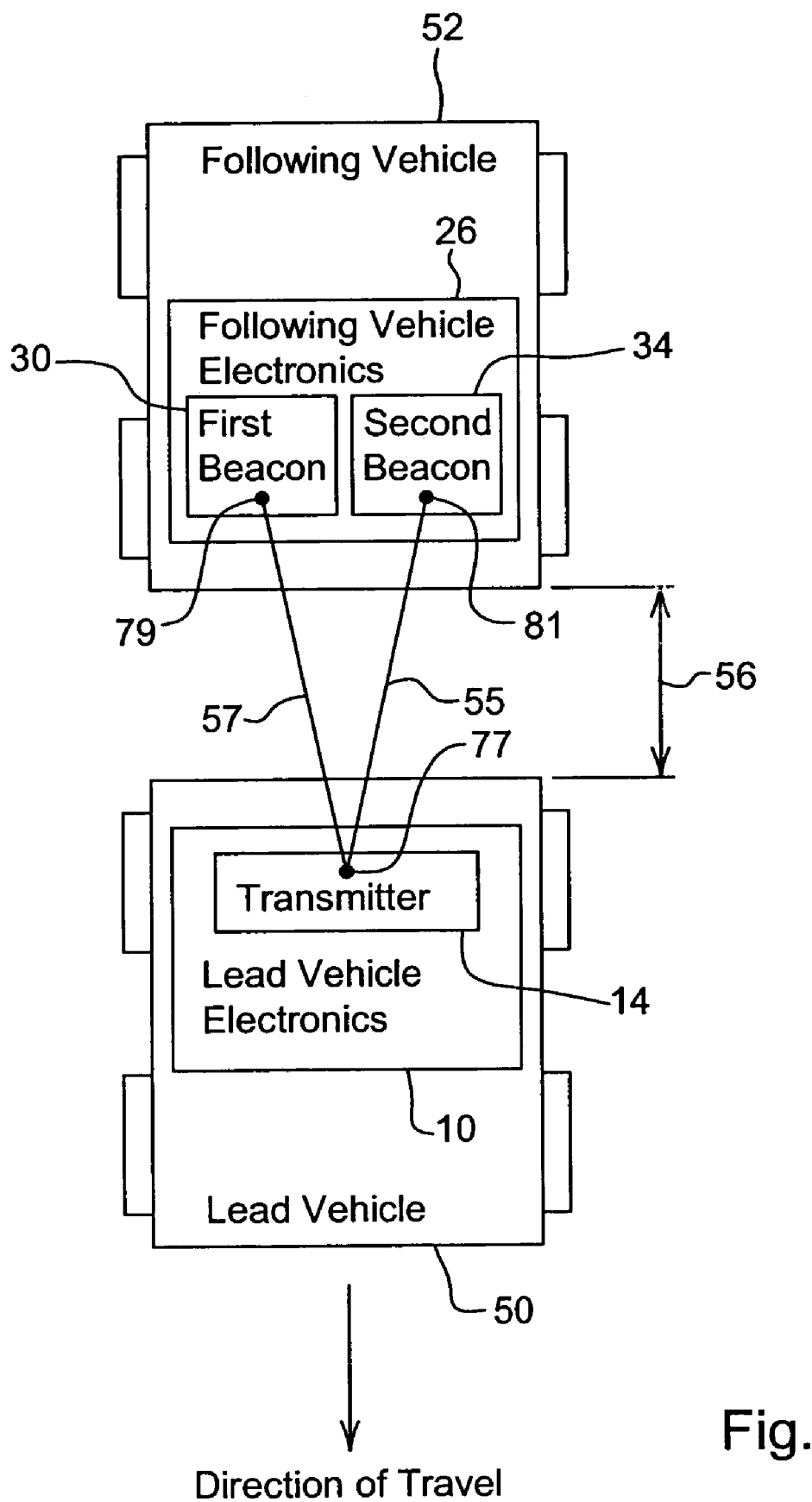
FIG. 6 illustrates a top view of lead vehicle and following vehicle, with a block diagram features transposed thereon, where the lead vehicle and the following vehicle maintain a generally linear alignment with respect to one another along a direction of travel.

FIG. 6 shows a plan view of a lead vehicle 50 and a following vehicle 52 separated by a separation distance 56. The transmitter 14 of the lead vehicle 50 and the first beacon 30 is associated with a first distance 55. The first distance 55 extends between the lead vehicle transmitter antenna 77 and the first follower vehicle antenna 79 of the first beacon 30. The transmitter 14 of the lead vehicle 50 and the second beacon 34 is associated with a second distance 57. The second distance 57 extends between the lead vehicle antenna 77 and the second follower vehicle antenna 81 of the second beacon 34. It should be noted that the points associated with each end of the first distance 55 and the second distance 57 comprise antennas or antenna elements associated with the lead vehicle electronics 10 and the following vehicle electronics 26. In a first tracking mode, the first distance 55 and the second distance 57 may form an angle with two generally equal sides or legs such that the following vehicle 52 tracks the leading vehicle. However, this tracking mode may present problems in maneuvering around obstacles or in sharp curves. For example, the leading vehicle may maneuver around a sharp turn or obstacle, but the following vehicle 52 may strike the obstacle if the first distance 55 and the second distance 57 are kept substantially equal at all times.

Figure 7:
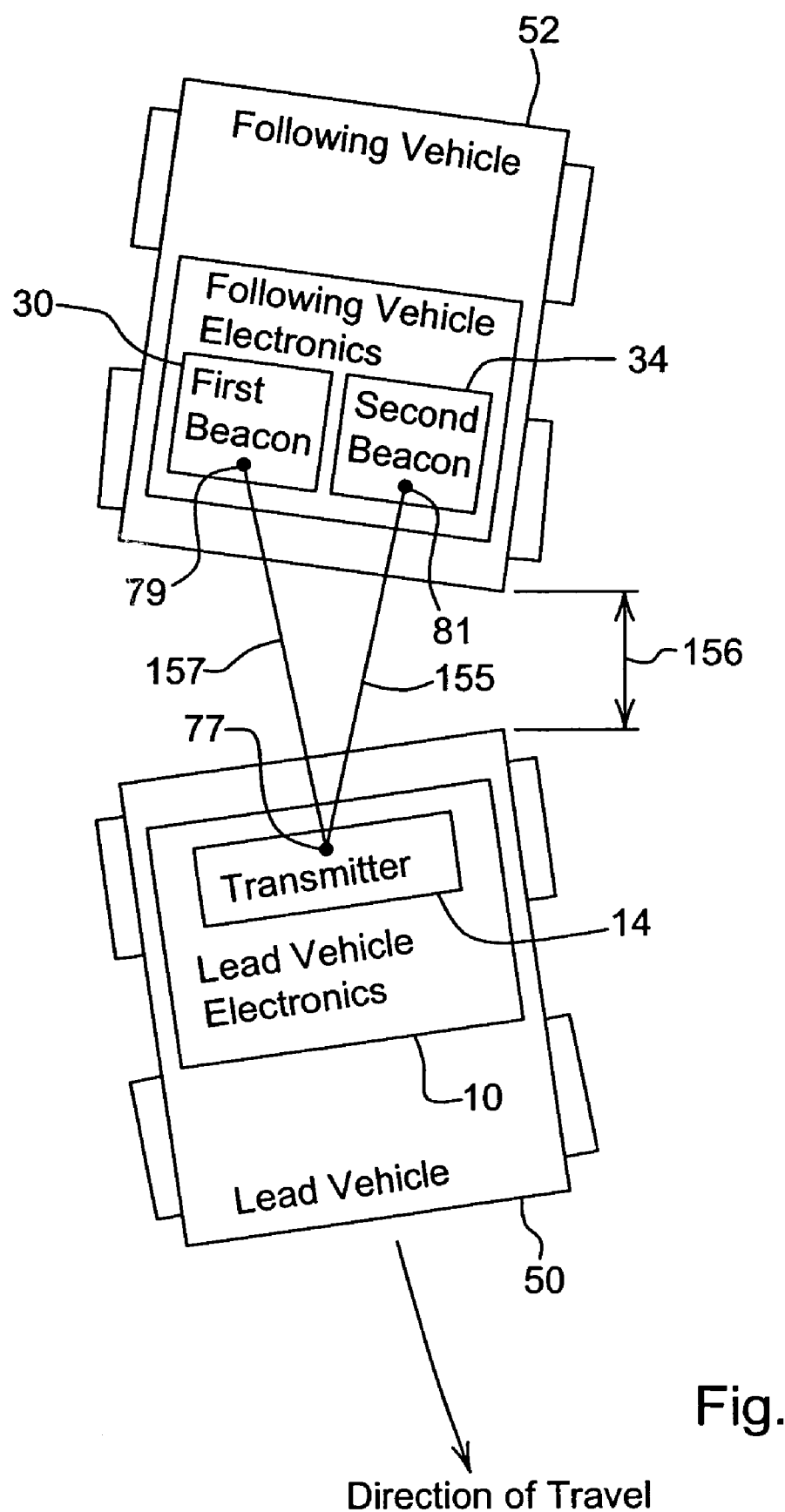
FIG. 7 illustrates a top view of a lead vehicle and a following vehicle, with block diagram features transposed thereon, where the lead vehicle and the following vehicle cooperate in a turning maneuver.

FIG. 7 illustrates a second tracking mode where, the first distance 155 and the second distance 157 are allowed to differ by a maximum amount to negotiate around a turn, an obstacle, or otherwise as the context requires. The inner leg (e.g., the first distance 155) that is radially closest to a center point of turn has shorter length than an other leg that is radially farthest from the counterpoint of turn. If the vehicles (50, 52) turn in the opposite direction to that shown in FIG. 7 the inner leg may comprise the other leg (e.g., the second distance 157). The separation distance 156 may be set to maintain a minimum clearance between the lead vehicle 50 and the following vehicle 52 when the vehicles (50, 52) are engaged in a turn. The separation distance 156 is proportional to the first distance and the second distance.

Figure 8:
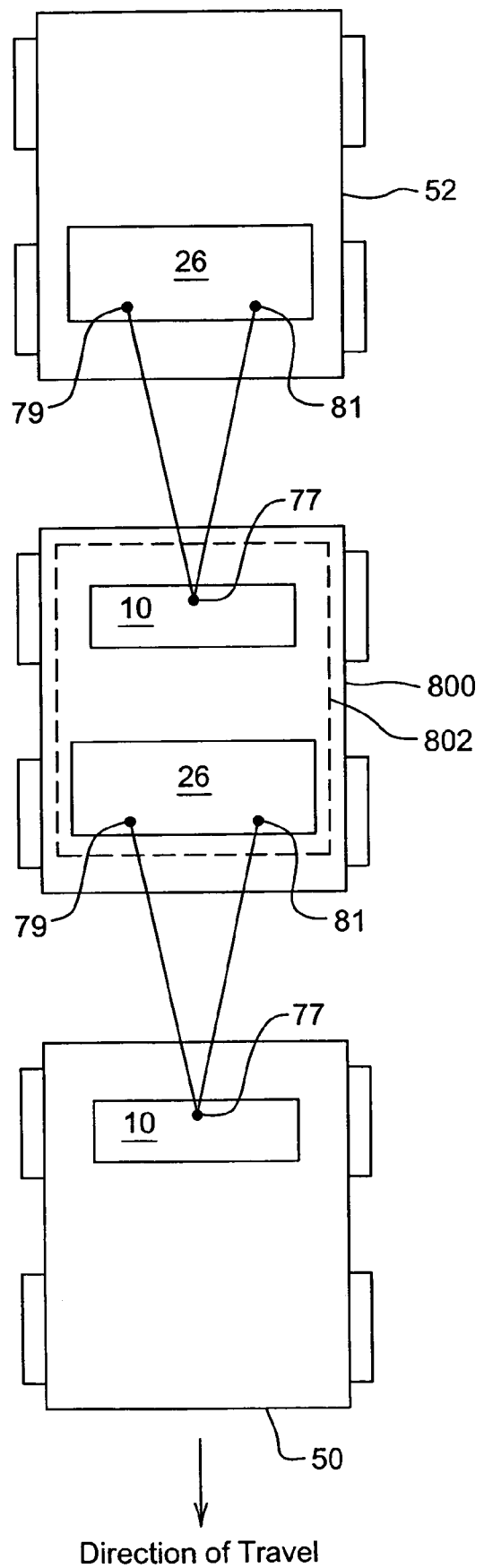
FIG. 8 illustrates a top view of the lead vehicle, an intermediate vehicle, and a following vehicle that form a train or group of vehicles.

FIG. 8 illustrates a train or convoy of vehicles. Like reference numbers in FIG. 7 and FIG. 8 indicate like elements.

The train of vehicles comprises a lead vehicle 50, one or more intermediate vehicles 800, and a following vehicle 52. A train means a line or file of vehicles that may proceed together, but are not necessarily mechanically coupled together. The lead vehicle 50 and the following vehicle 52 have been described in conjunction with FIGS. 6 and 7, for example. Each intermediate 800 vehicle comprises intermediate vehicle electronics 802. The intermediate vehicle electronics 802 is essentially a combination of the lead vehicle electronics 10 and the following vehicle electronics 26.

Figure 9:
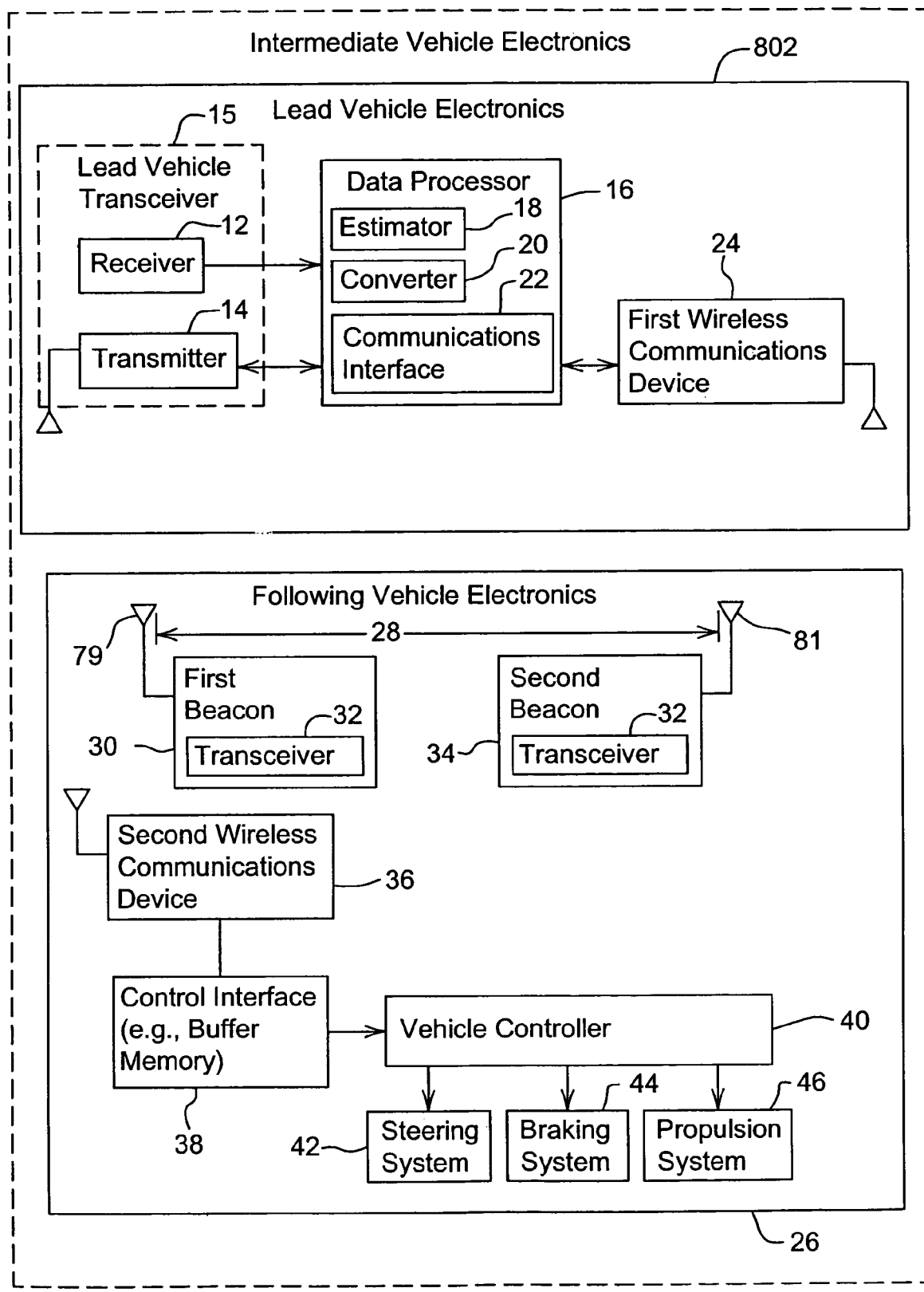
FIG. 9 is a block diagram of intermediate vehicle electronics associated with an intermediate vehicle of FIG. 8.

FIG. 9 shows the intermediate vehicle electronics in greater detail. Like reference numbers in FIG. 9 and FIG. 1A indicate like elements. The elements were previously described in conjunction with FIG. 1A, for example.

Figure 10:
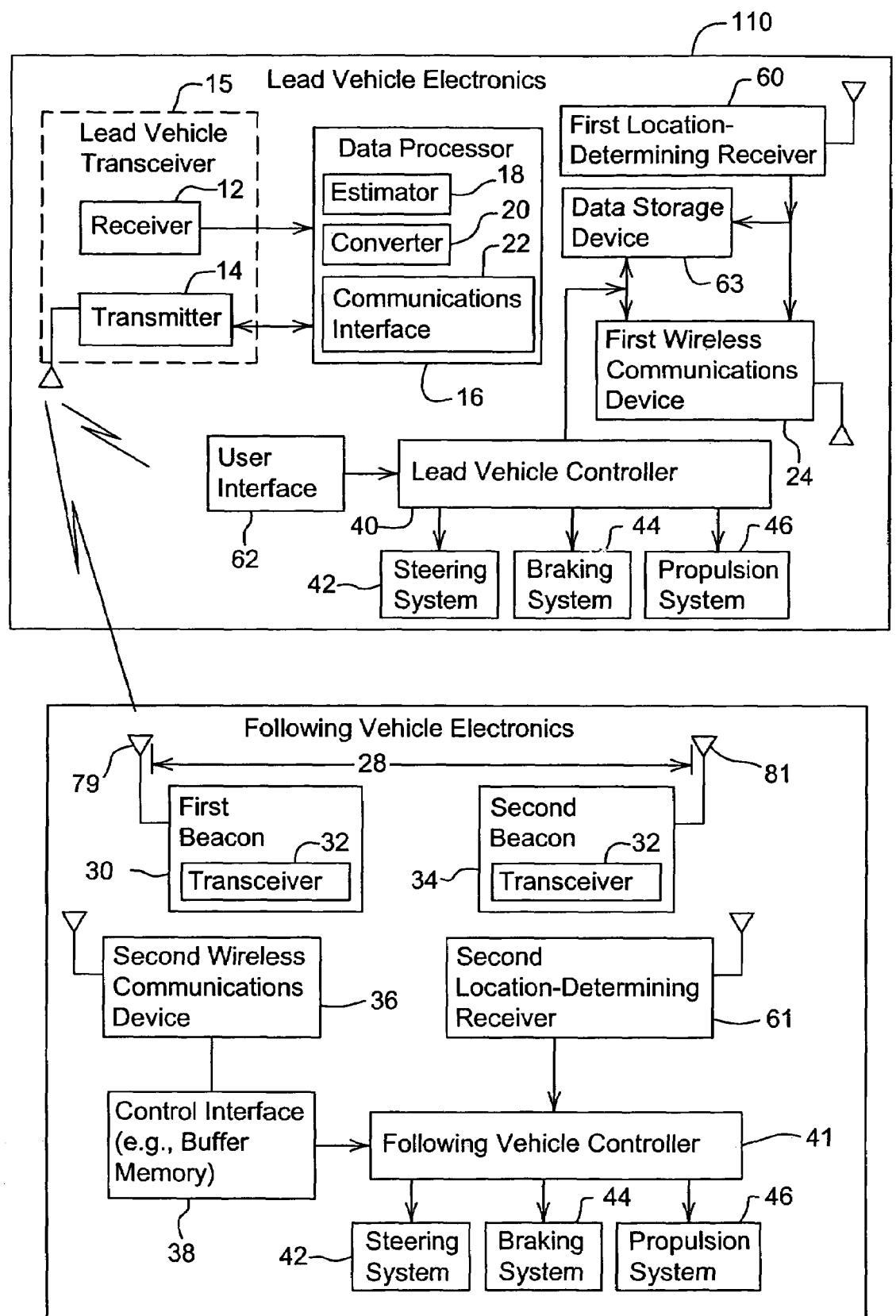
FIG. 10 is a block diagram of another embodiment of a system for following a lead vehicle in accordance with the invention.

The system for following a lead vehicle in FIG. 10 is similar to the system for following a lead vehicle in FIG. 1A, except additional equipment is included in the lead vehicle electronics 110 of FIG. 10 and the following vehicle electronics 126 of FIG. 10. Like reference numbers in FIG. 1A and FIG. 10 indicate like elements.

The lead vehicle electronics 110 comprises a first location-determining receiver 60, a user interface 62, a data storage device 63, a lead vehicle controller 40, a steering system 42, a braking system 44, and a propulsion system 46.

The following vehicle electronics 126 comprises a second location-determining receiver 61, a following vehicle controller 41, a steering system 42, a braking system 44, and a propulsion system 46.

The location determining receivers (60, 61) each may comprise a Global Positioning System (GPS) receiver with or without differential correction or another location determining receiver that relies at least partially upon the reception of satellite transmissions to determine location (e.g., coordinates), velocity, heading, or other position information.

The data storage device 63 is arranged to record a registration of a leading heading of the lead vehicle with the respective global position. The data storage device 63 may receive location data from the first location-determining receiver 60 and control data from the lead vehicle controller 40. The data storage device 63 may be associated with a format or registration module for temporally aligning the received location data and the received control data.

Figure 11:
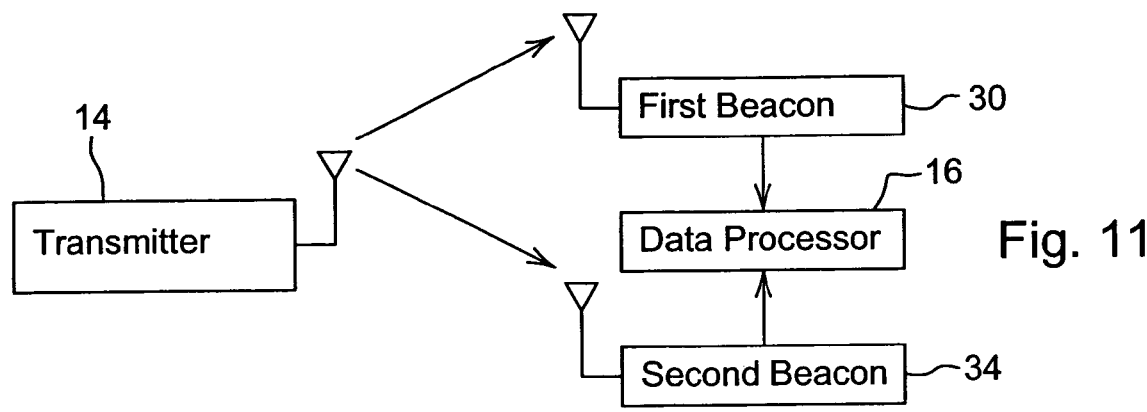
FIG. 11 through FIG. 13 are block diagrams that illustrate various configurations of systems for following a lead vehicle in accordance with the invention.
Figure 12:
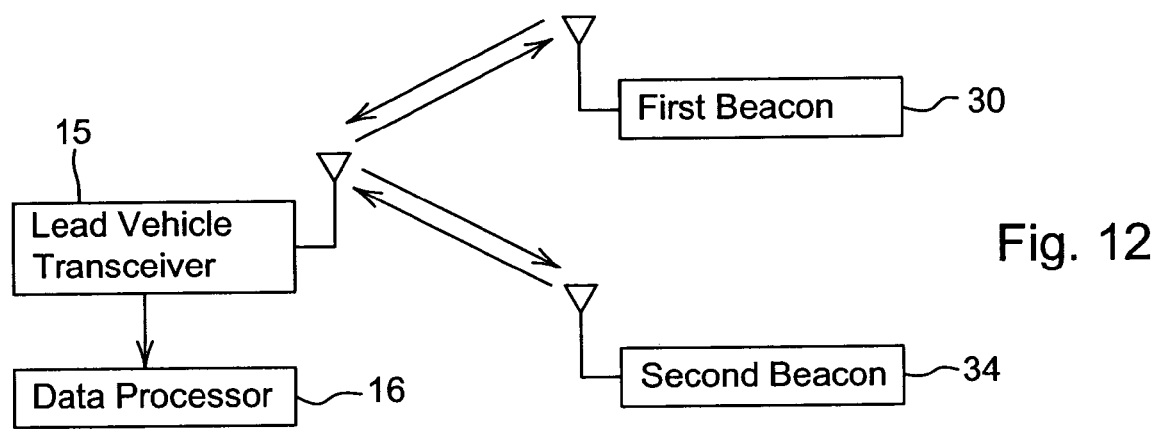
Figure 13:
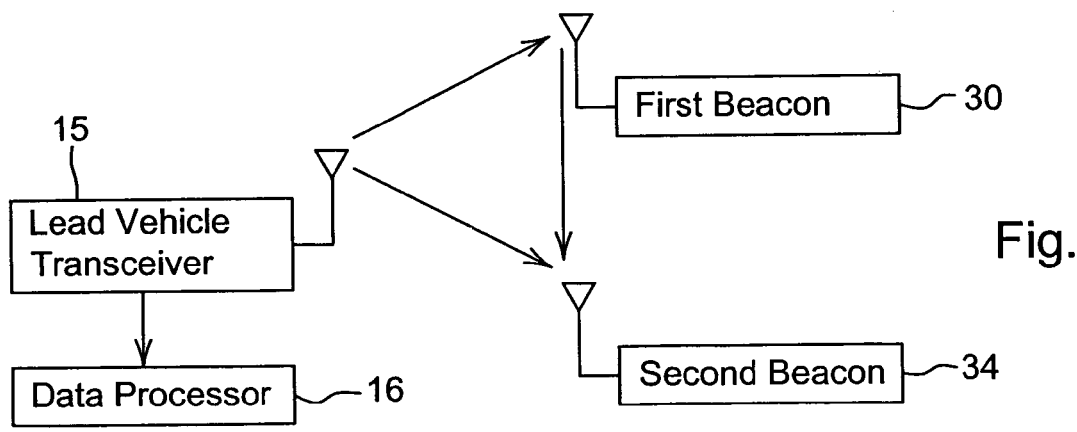

FIG. 11 and FIG. 13 indicate various illustrative possibilities for communications between the lead vehicle and the trailing vehicle. Like reference numbers in the previous drawings represent like elements for FIG. 11 through 13, inclusive. Under a first scenario of FIG. 11, two separate communications links are established: a first communications link between the transmitter 14 and the first beacon 30, and a second communications link between the transmitter 14 and the second beacon 34. The first and second communications links may be established on different physical or virtual channels. For example, the first communications link may be assigned to certain time slots (or generally orthogonal codes) of a electromagnetic signal and the second communications link may be assigned to other time slots (or other generally orthogonal codes) of the co-frequency electromagnetic signal. Under another arrangement different frequencies may be used for the first communications link and the second communications link to permit simultaneous communications.

The communications links may be one-way or two-way. If a one-way link is used the first beacon 30 and the second beacon 34 may be equipped with a data processor 16 for estimating a first distance (e.g., first distance 55 in FIG. 6) and a second distance (e.g., second distance 57 in FIG. 6) to keep the distances substantially equal or within a defined limit of substantially equal to accommodate turns, obstacle avoidance, and the like. Further, the one-way link may be associated with a one-way propagation time between the lead vehicle 150 and the following vehicle 52. If a two-way link is used, a two-way propagation time may be used to determine the first distance and the second distance at the lead vehicle.

Under a second scenario of FIG. 12 is similar to the first scenario of FIG. 11, except the transmitter 14 is replaced with a lead vehicle transceiver 32 at the leading vehicle and the data processor 16 is located at the lead vehicle. Under a second scenario of FIG. 11, two separate two-way communications links are established: a first two-way communications link between the lead vehicle transceiver 32 and the first beacon 30, and a second two-way communications link between the lead vehicle transceiver 32 and the second beacon 34. The first and second communications links may be established on differential physical or virtual channels. For example, the first communications link may be assigned to certain time slots (or generally orthogonal codes) of a electromagnetic signal and the second communications link may be assigned to other time slots (or other generally orthogonal codes) of the co-frequency electromagnetic signal. Under another arrangement different frequencies may be used for the first communications link and the second communications link to permit simultaneous communications.

FIG. 13 is similar to the configuration of FIG. 12. However, a first transmission (e.g., first one-way transmission) is from a lead vehicle transceiver 15 to a first beacon 30. A second transmission (e.g., a second one-way transmission) is from the first beacon 30 to the second beacon 34. A third transmission (e.g., a third one-way transmission) is from the second beacon 34 to the lead vehicle transceiver 15. The beacons in the configuration of FIG. 13 may be self-configuring upon set-up by sharing, transmitting or determining relative orientation to each other.

Having described the preferred embodiment, it will become apparent that various modifications can be made without departing from the scope of the invention as defined in the accompanying claims.

The following is claimed:

1. A method for following of a lead vehicle with a following vehicle, the method comprising:
   transmitting a first transmission signal from a transmitter at a lead vehicle toward a first beacon associated with a following vehicle;
   communicating between the first beacon and a second beacon spaced apart from the first beacon by a known distance;
   transmitting a second transmission signal from the second beacon to the lead vehicle;
   determining a first elapsed time between the transmission of the first transmission signal to a first beacon;
   determining a second elapsed time between the transmission of the second transmission signal from the second beacon to the lead vehicle;
   converting the first elapsed time into a first distance between the transmitter and the first beacon;
   converting the second elapsed time into a second distance between the transmitter and the second beacon; and
   controlling a heading of the following vehicle to maintain a first distance substantially equal to a second distance; and
   controlling a speed of the following vehicle to maintain at least one of a desired first distance and a desired second distance.

2. The method according to claim 1 wherein the controlling further comprising tracking a lead heading of the leading vehicle with a following heading of a following vehicle with a delay based on at least one of the speed and acceleration of the lead vehicle.

3. The method according to claim 1 further comprising:
   determining a global position of the lead vehicle based at least partially on a reception of a group of satellite signals;
   determining a global position of the following vehicle based at least partially on a reception of a group of satellite signals;
   recording a registration of a leading heading of the lead vehicle with the respective global position;
   controlling the following heading of the following vehicle to match that of the lead vehicle at the respective global position provided that the leading vehicle and following vehicle maintain a minimum separation.

4. A system for following of a lead vehicle with a following vehicle, the system comprising:
   a transmitter for transmitting a first transmission signal from a transmitter at a lead vehicle toward a first beacon and a second beacon associated with a following vehicle, the first beacon and second beacon separated by a known distance;
   an estimator for determining a first aggregate elapsed time between the transmission of the first transmission signal to a first beacon and a return signal from the first beacon to the lead vehicle, the estimator arranged to determine a second aggregate elapsed time between the transmission of the first transmission signal to a second beacon and a return signal from the second beacon to the lead vehicle;
   a converter for converting the first aggregate elapsed time into a first distance between the transmitter and the first beacon and for converting the second aggregate elapsed time into a second distance between the transmitter and the second beacon; and
   a vehicle controller for controlling a heading of the following vehicle to maintain a first distance substantially equal to a second distance, wherein the vehicle controller controls a speed of the following vehicle to maintain at least one of a desired first distance and a desired second distance.

5. The system according to claim 4 wherein the vehicle controller tracks a lead heading of the leading vehicle with a following heading of a following vehicle with a delay based on at least one of the speed and acceleration of the lead vehicle.

6. The system according to claim 4 further comprising:
   a first location determining receiver for determining a global position of the lead vehicle based at least partially on a reception of a group of satellite signals;
   a second location determining receiver for determining a global position of the following vehicle based at least partially on a reception of a group of satellite signals;
   a data storage device for recording a registration of a leading heading of the lead vehicle with the respective global position;
   a following vehicle controller for controlling the following heading of the following vehicle to match that of the lead vehicle at the respective global position provided that the leading vehicle and following vehicle maintain a minimum separation.

7. A system for following of a lead vehicle with a following vehicle, the system comprising:
   a transmitter for transmitting a first transmission signal from a transmitter at a lead vehicle toward a first beacon associated with a following vehicle;
   a wireless communications device for communicating between the first beacon and a second beacon spaced apart from the first beacon by a known distance;
   a transceiver for transmitting a second transmission signal from the second beacon to the lead vehicle;
   an estimator for determining a first elapsed time between the transmission of the first transmission signal to a first beacon and for determining a second elapsed time between the transmission of the second transmission signal from the second beacon to the lead vehicle;
   a converter for converting the first elapsed time into a first distance between the transmitter and the first beacon and for converting the second elapsed time into a second distance between the transmitter and the second beacon; and
   a vehicle controller for controlling a heading of the following vehicle to maintain a first distance substantially equal to a second distance, wherein the vehicle controller controls a speed of the following vehicle to maintain at least one of a desired first distance and a desired second distance.

8. The. system according to claim 7 wherein vehicle controller comprises tracking a lead heading of the leading vehicle with a following heading of a following vehicle with a delay based on at least one of the speed and acceleration of the lead vehicle.

9. The system according to claim 7 further comprising:
   a first location determining receiver for determining a global position of the lead vehicle based at least partially on a reception of a group of satellite signals;
   a second location determining a global position of the following vehicle based at least partially on a reception of a group of satellite signals;

a data storage device for recording a registration of a leading heading of the lead vehicle with the respective global position;

a following vehicle controller for controlling the following heading of the following vehicle to match that of the lead vehicle at the respective global position provided that the leading vehicle and following vehicle maintain a minimum separation.

10. A method for following of a lead vehicle with a following vehicle, the method comprising:

transmitting a first transmission signal toward a first beacon and a second beacon associated with a following vehicle;

determining a first propagation time associated with the first transmission and the first beacon and a second propagation time associated with the first transmission and the second beacon;

controlling a heading of the following vehicle to maintain a first propagation time substantially equal to the second propagation time for straight or a linear path segment and controlling a heading of the following vehicle to maintain the first propagation time that deviates from the second propagation time by a predetermined maximum amount for a curved path or turn.

* * * * *